3,825,436
Patented July 23, 1974

3,825,436
METHOD OF MAKING RARE EARTH OXYSULFIDE LUMINESCENT FILM
Robert A. Buchanan, Palo Alto, Ronald V. Alves, Saratoga, T. Grant Maple, Woodside, and Leon E. Sobon, Los Altos, Calif., assignors to Lockheed Missiles & Space Company, Inc., Sunnyvale, Calif.
Filed Oct. 4, 1972, Ser. No. 294,902
Int. Cl. B44d 1/02; C03c 3/28; H01j 1/54
U.S. Cl. 117—33.5 R    2 Claims

ABSTRACT OF THE DISCLOSURE

This invention relates to high brightness, high contrast, high resolution rare earth crystalline luminescent films and processes for making such films. More particularly, the films are rare earth, crystalline oxysulfides of lanthanum, gadolinium, yttrium and lutetium activated with trivalent rare earth ions having atomic numbers from 59 through 70.

BACKGROUND OF THE INVENTION

Luminescent screens are normally composed of powder phosphor materials. Because of their particulate nature, these screens have limited brightness, resolution and contrast. Brightness is limited by phosphor heating which results from poor thermal conductivity between phosphor particles and the substrate. Resolution is limited by the particulate discontinuities and transverse light migration within the particulate screen. Contrast is limited because particulate screens inherently have a large diffuse reflectivity of ambient light.

Continuous luminescent films offer a solution to the problems imposed by particulate screens. Continuous films are synthesized directly on the substrate and contain no individual phosphor particles. Such continuous films, because they are in good thermal contact with the substrate, do not readily become overheated and hence can produce higher brightness outputs. Such films also being transparent, do not degrade resolution by transverse light scattering within the layer. Finally, contrast can be improved over particulate screens since these films do not inherently diffusely reflect the ambient radiation.

Many attempts have been made to produce such continuous luminescent films. One obvious approach is to evaporate conventional phosphor materials onto appropriate substrates. This approach has been attempted for a large number of phosphor materials and the results have not been satisfactory. The luminous efficiency of the material is lost in the evaporation process and the resulting films are at best only weakly luminescent.

Over the years, workers have developed several techniques for preparing luminescent films. In general, each technique is limited to a single phosphor material or to a family of chemically similar materials. Continuous luminescent screens of the zinc-cadmium-sulfo-selenide family are described by D. A. Cusano et al. in U.S. Pat. No. 2,685,530, and similar screens of the zinc-magnesium-fluoride family are described by D. A. Cusano et al. in U.S. Pat. No. 2,789,062. ZnO:Mn luminescent films and techniques for making them are described by D. A. Cusano in U.S. Pat. No. 3,108,904. High efficiency luminous film of ZnCdS:Ag and a process for their production are described by P. H. Wendland in U.S. Pat. No. 3,347,693. Still another process for making phosphors of the zinc-cadmium-sulfide, selenide, and telluride family is described by L. W. Hershinger in U.S. Pat. No. 3,127,282. These references contain references to still earlier work describing methods of preparation of phosphor materials in the form of continuous luminescent films. Thus, there is no universal process for making continuous, luminescent films, but, on the contrary, each phosphor material has one or more processes uniquely suited for the preparation of the particular materials, if the material can in fact be processed into a film.

Regarding multi-layer films, each phosphor has typically its own characteristic emission color, and in order to put together films of different emission colors one must use different phosphor systems. This leads to complications since, in general, the different phosphor systems have different indices of refraction, different thermal expansion coefficients and, not infrequently, one phosphor system will poison the luminescence from another phosphor. These complications severely limit the phosphor types which can be combined into multiple layer film screens. A discussion of these limitations is included in the reference, C, Feldman, J. Optical Soc. of Am. 47, 790 (1957).

One way to avoid these complications would be to use a highly stable rare earth oxide system. Such a system would have the advantage that the different rare-earth activators would provide different emission colors in the same host, thus allowing the production of multicolor luminescent films of the same index of refraction and thermal expansion coefficient. In addition, because of the chemical stability of the oxide system, these layers of different emission color would not poison the luminous efficiency of each other. Unfortunately, when this was tried the results were far from encouraging. W. W. Hansen and R. E. Myers in U.S. Pat. 3,434,863 reported that continuous luminescent films of the activated rare earth oxides had luminous efficiencies of only a fraction of powder screens of $Y_2O_3$. It is well known that powder screens of $Y_2O_3$ have an efficiency significantly less than powder screens of $Y_3O_3$ properly activated with another rare earth ion, such as $Tb^{3+}$, for high luminous efficiency. Thus, the teaching of this patent is that luminescent films of activated rare-earth oxide have only a small fraction of the efficiency of their powder screen counterpart.

High efficiency phosphor powder materials of rare earth oxysulfide compositions have been reported by M. R. Royce in U.S. Pat. No. 3,418,246 and P. N. Yocom in U.S. Pat. No. 3,418,247. Neither these patents nor any other patents or reports to applicants' knowledge teach the properties or preparation procedures for luminescent films of the rare-earth oxysulfide compositions.

SUMMARY OF THE INVENTION

Briefly, in accordance with the invention, it has been discovered that certain rare earth crystalline oxysulfide films have intrinsic luminescent efficiencies approximately equivalent to their counterpart materials in particulate form. Such luminescent films also have high resolution and high contrast, resulting from the continuous nature of such films. The crystalline films have the composition $Ln_2O_2S:RE^{+3}$ wherein Ln is at least one trivalent rare earth selected from the group consisting of lanthanum, gadolininum, yttrium and lutetium and $RE^{+3}$ is at least one trivalent activator ion selected from the group consisting of rare earth ions having atomic numbers 59 through 70 and in which from about 0.001 to 20 mol percent, and preferably from about 0.01 to 10 mol percent of the trivalent host ions have been replaced by at least one trivalent activator ion. It has further been discovered that the continuous crystalline luminescent films of the invention are realized by two differing processing techniques.

A single layer film of the invention can be used as the visual display screen in a cathode ray tube. The emission color of the luminescent film will be determined by the luminescent activator. The colors produced by each activator are well known in the art. See, for example, U.S. Pats. 3,418,246 and 3,418,247. Such a film can also be used as the input screen for an X-ray image intensifier tube. Single layer films are also useful for detecting nuclear particles such as alphas, betas and neutrons. The emission color of each luminescent activator is relatively independent of which type of excitation is being used. The particular application will usually dictate which host material and which activator to use. For example, neutrons are most readily detected with gadolinium oxysulfide since gadolinium has an extremely large cross-section for thermal neutrons.

Multiple layer films of the invention can find utility in multicolor cathode-ray tube display screens. In this application, screens emitting primary colors red, green and blue could be selected to give the optimum color rendition.

Film thickness depends upon the application. Films of the order of 0.3 to 3 microns thick are optimum for cathode ray tube applications. Films several hundred microns thick are more suitable for high energy X-rays and gamma-rays.

BRIEF DESCRIPTION OF THE DRAWING

The invention may be more easily understood from the following description and accompanying drawings in which.

DESCRIPTION OF THE PREFERRED EMBODIMENT

Figure 1:
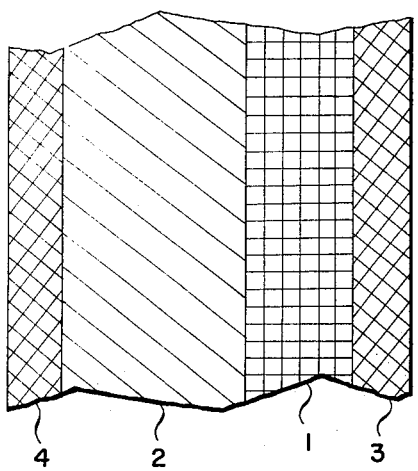
FIG. 1 is a cross-sectional view of a screen utilizing the films of the invention.

Referring more particularly to FIG. 1, there is shown a typical crystalline film luminescent screen which is continuous rather than particulate, wherein a single continuous luminescent film (1) is formed on a supporting substrate (2) which, depending on the application, may be either transparent or opaque. If the substrate is an insulating transparent material such as sapphire or quartz, there may be a conducting coating (3) placed upon the film (1) in order to remove charge or reflect the emitted light through substrate (2). An antireflection coating (4) may be placed upon substrate (2) to improve contrast. Contrast may be further enhanced if coating (3) is made non-reflective by techniques known to the art such as described in U.S. Pat. No. 3,560,784. Such a screen would have particular utility in cathode-ray tube. If substrate (2) is made of a non-transparent material, such as refractory metal or a ceramic, thin coating (4) is typically omitted when coating (3) is a photocathode material and the resulting screen would have utility as the input screen of an X-ray image intensifier tube.

The screen of FIG. 1 is readily modified to form two or more continuous layers on substrate (2) in place of the single continuous film (1) shown. When substrate (2) is a transparent material, coating (3) is conductive and/or non-reflective and coating (4) is antireflecting, the resulting configuration has utility as a multicolor display screen for a cathode-ray tube. As will be discussed in conjunction with FIG. 5, different colors are produced by varying the energy of electrons, for example, with different applied acceleration potentials.

Figure 5:
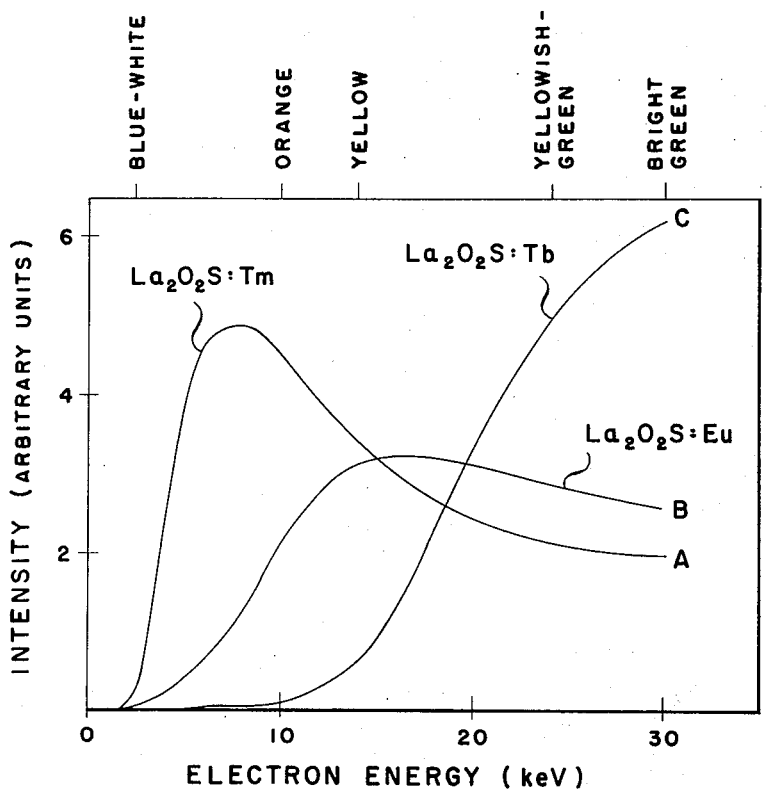

As is understood by the art, the excitation of luminescence of the films of the invention is produced by electrons, protons, alphas, neutrons and other energetic particles as well as photons of visible, ultraviolet, X-ray and v-ray energies with different colors being produced, as shown by FIG. 5, for different energies of the particles in the multilayer luminescent film case.

Since the crystal structure of each oxysulfide film of the invention is the same, since the valence electronic structure of each film is very similar, and because of uniformity of ion-size and chemical similarity, all films of the invention are processed according to the examples herein set forth. Furthermore, any one rare earth constituent or combinations thereof can be substituted into any other oxysulfide to any concentration.

The continuous films of the invention are understood to include films which have been constructed to contain internal fractures and film surface or volume variations, both regular and irregular. Such internal fractures and film variations are useful in many instances in increasing film brightness by coupling out the light that would be trapped in a plane parallel film. Illustrative examples of film variations are roughening of at least one film surface or manufacturing the film screen in the form of small pyramids.

Figure 2:
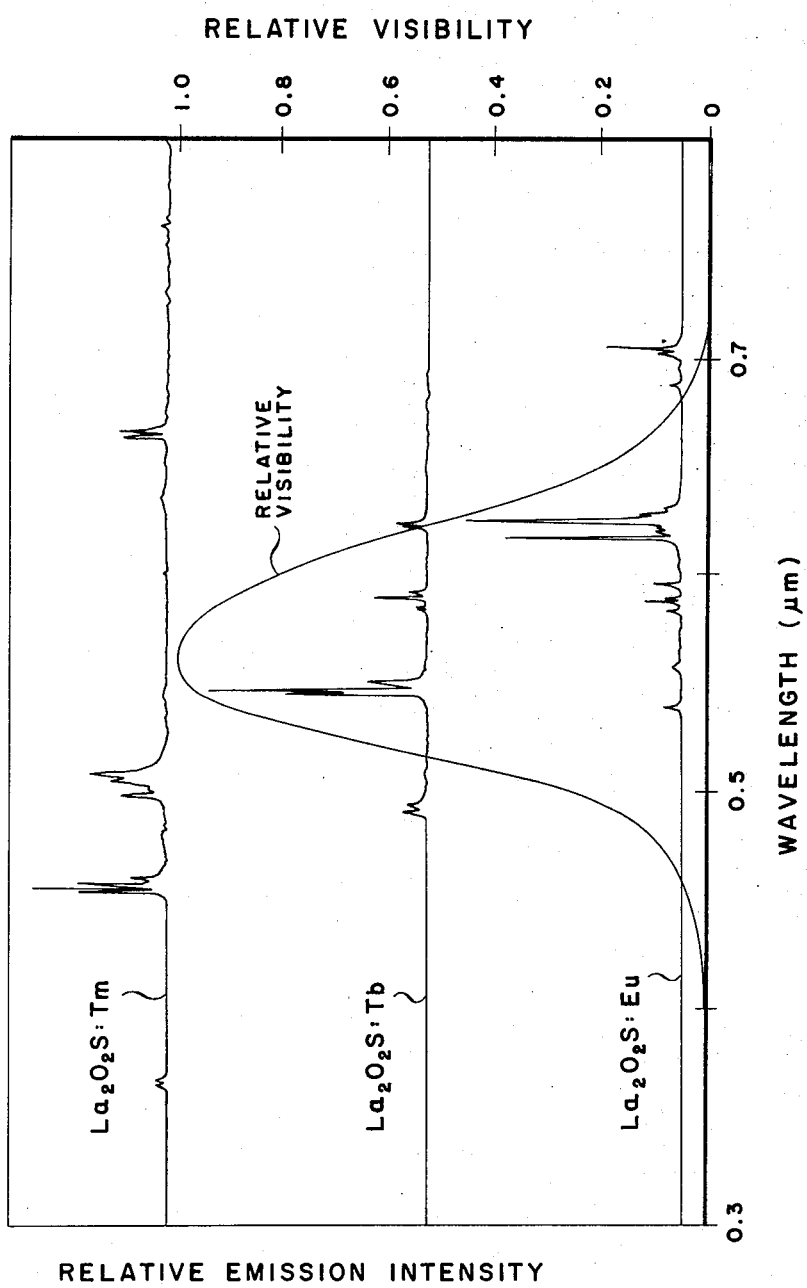
FIG. 2, on coordinates of relative emission intensity and wavelength in Angstrom units, is a plot showing the emission spectrum and relative visibility of three lanthanum oxysulfide films activated, respectively, with 0.2 percent Tb, 6.5 percent Eu and 0.5 percent Tm and excited with a conventional, demountable electron beam excitation apparatus.

FIG. 2 of the drawing depicts the emission spectrum of typical films of the invention and shows that the depicted films, and, accordingly, all films of the invention, have an emission spectrum which is identical, apart from an intensity sealing factor, to the emission spectrum of their counterpart material in particulate form.

To obtain the spectrum depicted in this figure, the three films were prepared in accordance with Method I hereinafter described and deposied on sapphire substrates. The films were 0.9 micron thick with a 800 A layer of aluminum on the surface of the film opposite the substrate. A conventional demountable electron beam excitation apparatus was used to produce luminescence. The emission spectrum was measured with a Spex 1700 grating monochromator and S—20 photomultiplier.

Figure 3:
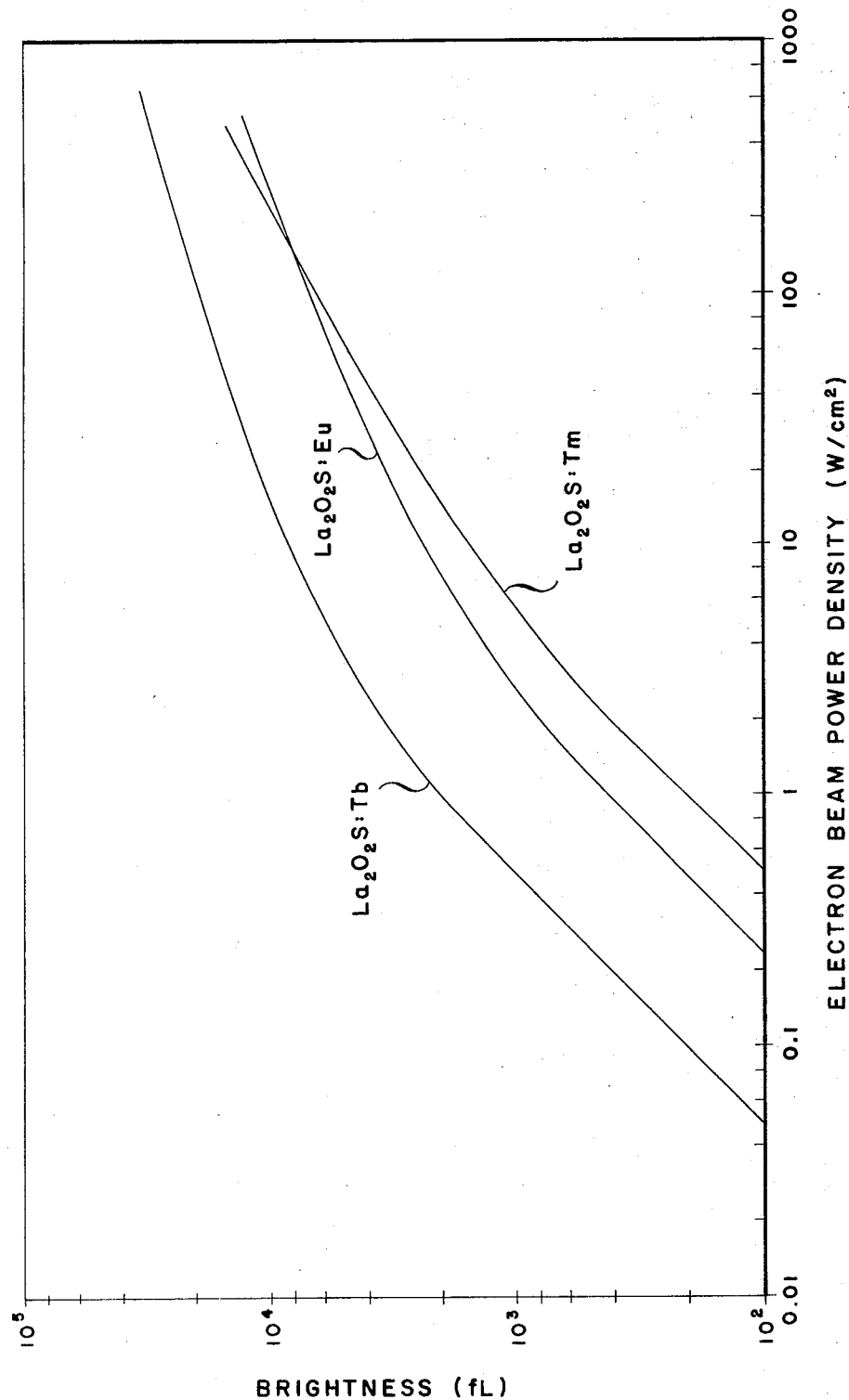
FIG. 3, on coordinates of electron beam power density and brightness is a logarithmic plot showing the brightness of the three films of FIG. 2 as a function of electron beam power.

FIG. 3 of the drawing depicts the typical dependency of the brightness of the films of the invention on electron beam power density. The depicted curves were obtained by measuring the brightness of the three films described in conjunction with FIG. 2 while maintaining the substrate temperature below 50° C. The brightness readings were obtained with a commercial brightness spot meter calibrated directly in foot-lamberts.

Figure 4:
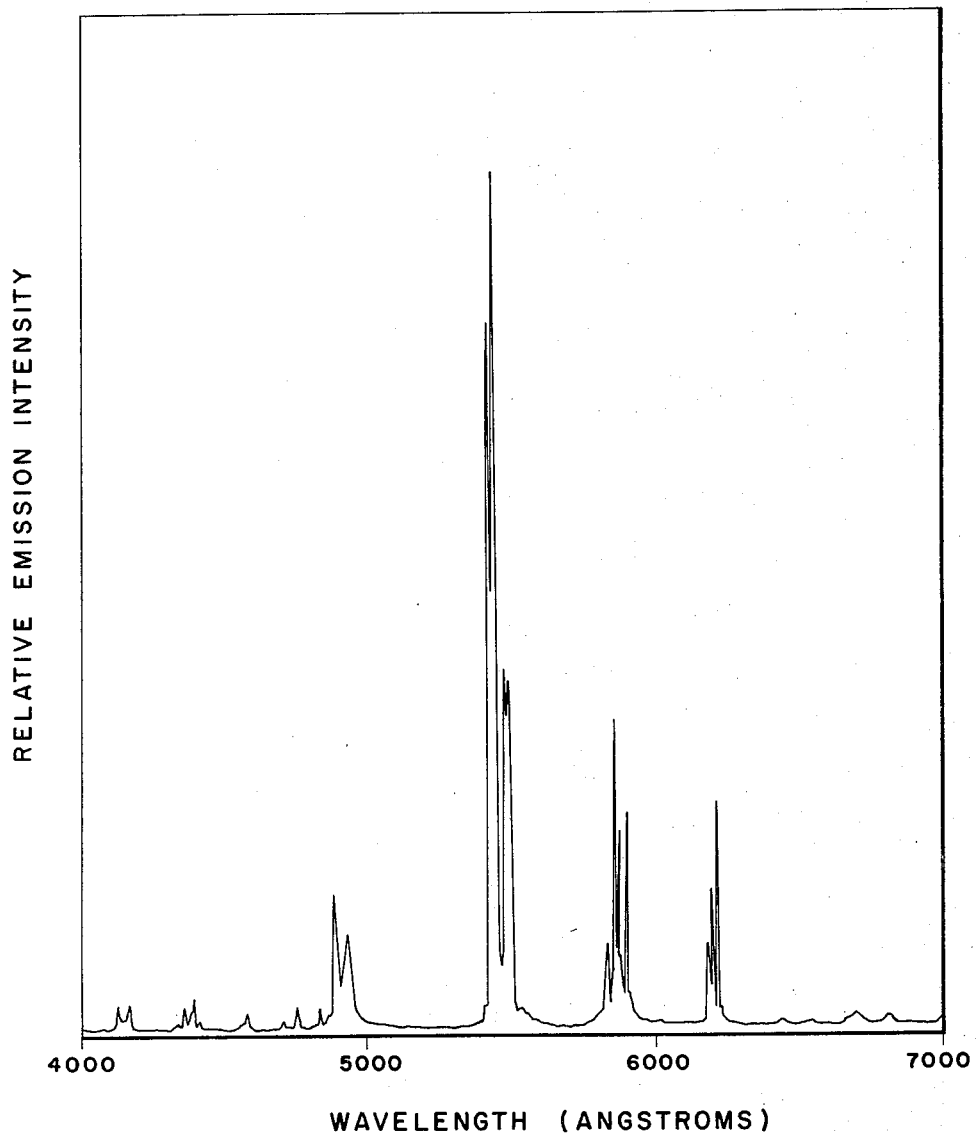
FIG. 4, on coordinates of relative emission intensity and wavelength in Angstrom units, is a plot showing the emission spectrum of gadolinium oxysulfide activated with 0.2 percent Tb and excited with a conventional, demountable electron beam excitation apparatus; and FIGG. 5, on coordinates of intensity and electron energy, is a plot showing the emission color and intensity dependency of a trilayer film system of the invention upon electron beam voltage.

FIG. 4 of the drawing depicts the emission spectrum of a gadolinium oxysulfide film of the invention activated with 0.2 percent terbium. The film was prepared in accordance with Method I hereinafter described and deposited on a sapphire substrate. The film was 10 microns thick and had a 800 A. layer of aluminum on the surface opposite the substrate. A conventional demountable electron beam excitation apparatus was usel to produce luminescence. The emission spectrum was measured with a Spex 1700 grating monochromator and S–20 photomultiplier. This emission spectrum is identical, apart from an intensity scaling factor, to the emission spectrum of its counterpart material in particulate form. An identical spectrum to FIG. 4 was obtained for the same oxysulfide film prepared by Method II hereinafter discussed with the exception that the spectrum contained several impurity emission lines due to the starting materials which were of lower purity than those used in Method I.

FIG. 5 of the drawing depicts the dependency of emission color of a trilayer film system of the invention upon electron beam voltage. The system was composed of three layers of lanthanum oxysulfide containing successively, 0.2 percent Tb, 6.5 percent Eu and 0.5 percent Tm. Each layer was made in accordance with Method I, with the first 0.2 percent Tb layer being deposited on a sapphire substrate. Data for the figure was obtained by adjusting the Spex monochromator to detect the characteristic emission from each layer separately as the energy of the electron beam was increased from 0 to 30 kiloelectron volts. The coordinate reading is proportional to the current in the S–20 photomultiplier except that the $La_2O_2S$:Tm readings have been multiplied by 100 for more convenient reading. The top of the figure indicates the subjective color observed at various electron energies. The observed color is the result of the addition of the colors being emitted by each layer.

The luminescent films of the invention are readily formed on a variety of substrate materials, for example sapphire, alumina, quartz or vanadium metal. The particular choice of substrate is determined by the use of the resulting screen.

Continuous luminescent films of the invention are produced by several methods. Illustratively, in accordance with Method I, a target material composed of the desired hot-pressed rare-earth oxysulfide phosphor and substrate is placed into a conventional RF sputtering system. The desired target, in the form of a sintered disk, 5 inches in diameter and 0.25 inch thick, is pressed from the phosphor powder in a graphite die under argon atmosphere at a pressure of 1920 p.s.i. and a temperature of 1410° C. and allowed to sinter under these conditions for about one hour. RF sputtering under standard conditions, that is, about 5 microns of ultra pure argon as the sputtering medium, produces a film which is predominately the rare-earth oxysulfide with relatively low luminous efficiency. The efficiency is increased when a pressure of 0.01 micron of $H_2S$ is added to the sputtering medium. This pressure can vary from approximately 0.001 to 0.015 micron. Films made under these conditions have been shown by X-ray diffraction analysis to have the proper hexagonal structure of the rare-earth oxysulfide and such films are more efficient than films produced with no $H_2S$ in the sputtering medium.

However, such films still fall short of the luminescent efficiencies exhibited by their counterpart material in particulate form. A dramatic increase in the brightness of the films occurs when the films are given a post-deposition treatment. This treatment consists of exposing the films to a $H_2$ plus $SO_2$ atmosphere at temperatures of about 700° C. to 1500° C., preferably 1000° C., for about 30 minutes. The preferred $H_2$ and $SO_2$ concentrations are about 10 parts by volume $H_2$ to one part by volume $SO_2$, but $H_2$ to $SO_2$ concentrations ranging from 1:1 to 15:1 are useful. This treatment increases luminous efficiency by a factor upwards of ten. Spectral emission of films made before the post-deposition treatment show considerably broadened lines. However, after treatment, the emission lines are sharp and coincide exactly in wavelength and line width with those of the original phosphor powder.

In accordance with Method II, a rare earth metal of high purity, which serves as the host cation, is mixed with an appropriate amount of another rare earth metal which serves as the luminescent activator. Together, these metals are evaporated onto an appropriate substrate by conventional techniques; the metals may be evaporated without prior mixing. After evaporation, the metallic film is converted to a rare-earth oxide form. For example, for lanthanum, this consists of exposing the film to air at room temperature for a few minutes; gadolinium, on the other hand, is converted to the oxide form by heating in air at 1000° C. for 60 minutes. The other metallic films of the invention are converted to the oxide form by techniques well understood by the art. Different thickness films naturally require different temperatures and heating times. The step to convert the metal to metal oxide is recognized as complete when the metallic nature of the film is no longer observed. The evaporated film is then exposed to an atmosphere of hydrogen plus sulfur dioxide in accordance with Method I.

Hydrogen, sulfur and oxygen gases have heretofore been used to convert particulate $La_2O_3$ to $La_2O_2S$; see U.S. Pat. 3,515,675. Since this conversion process is a surface reaction, it is not obvious that it would be satisfactory for converting a continuous film of $La_2O_3$ to the corresponding oxysulfide film, particularly where the surface area of the particulate material is many times larger than the surface area of a continuous film. Likewise, it would not appear obvious that such a process would leave the film transparent and still intact with the substrate.

What is claimed is:

1. A method for making a continuous, rare earth crystalline oxysulfide luminescent film consisting essentially of the composition $Ln_2O_2S$:RE, where Ln is at least one trivalent rare earth host ion selected from the group consisting of lanthanum, gadolinium, yttrium and lutetium and RE is at least one trivalent activator ion selected from the group consisting of rare earth ions having atomic numbers 59 through 70 and in which from about 0.001 percent to 20 percent of the trivalent host ions have been replaced by at least one said activator ion, said process consisting essentially of the steps of:

forming on a substrate a film layer of a continuous rare earth oxide film containing said activator and host ions in concentrations in accordance with said formula; and heat treating said film in an atmosphere of reactive constituents of hydrogen and sulfur dioxide to form a corresponding oxysulfide film having emission lines coinciding in wavelength and line width with the emission lines and wavelength exhibited by the corresponding particulate oxysulfide phosphor.

2. A method in accordance with Claim 1 wherein from about 0.01 percent to 10 percent of said host ions have been replaced with said activator ions.

References Cited

UNITED STATES PATENTS

| | | | |
|---|---|---|---|
| 2,685,530 | 8/1954 | Cusano | 117—33.5 C |
| 2,789,062 | 4/1957 | Cusano | 117—33.5 C |
| 3,108,904 | 10/1963 | Cusano | 117—211 |
| 3,347,693 | 10/1967 | Wendland | 117—33.5 C |
| 3,127,282 | 3/1964 | Hurshinger | 117—33.5 R |
| 3,434,863 | 3/1969 | Hansen et al. | 117—33.5 R |
| 3,418,246 | 12/1968 | Royce | 252—301.4 |
| 3,418,248 | 12/1968 | Yocom | 252—301.4 |
| 3,560,784 | 2/1971 | Steele | 313—92 |
| 3,515,675 | 6/1970 | Byler et al. | 252—301.4 |
| 3,681,245 | 8/1972 | Lee | 252—62.51 |
| 3,738,856 | 6/1973 | Masi | 117—33.5 C |
| 2,949,382 | 8/1960 | Dickerman et al. | 117—33.5 T |
| 2,950,222 | 8/1960 | Hinson | 117—33.5 R |
| 3,043,710 | 7/1962 | Patten et al. | 117—33.5 R |
| 3,247,414 | 4/1966 | Levetan | 117—33.5 E |

FOREIGN PATENTS

| | | | |
|---|---|---|---|
| 814,421 | 6/1959 | Great Britain | 117—33.5 C |

OTHER REFERENCES

Tech. Notes TN #808, RCA, Dec. 11, 1968, by Martin et al. Two Stage Firing of Europium-Activated Yttrium Oxysulfide Phosphor.

WILLIAM D. MARTIN, Primary Examiner

W. R. TRENOR, Assistant Examiner

U.S. Cl. X.R.

117—33.5 C, CM, CP, 63, 106 R; 252—301.4 R, 62.51; 264—21, 82, 83, 161; 313—92 R, P